(12) United States Patent
Macken et al.

(10) Patent No.: US 8,194,360 B2
(45) Date of Patent: Jun. 5, 2012

(54) DOMAIN CONTROL IN BOTTOM SHIELD OF MR SENSOR

(75) Inventors: Declan Macken, Prior Lake, MN (US); Eric W. Singleton, Maple Plain, MN (US)

(73) Assignee: Seagate Technology LLC, Cupertino, CA (US)

(*) Notice: Subject to any disclaimer, the term of this patent is extended or adjusted under 35 U.S.C. 154(b) by 581 days.

(21) Appl. No.: 12/391,404

(22) Filed: Feb. 24, 2009

(65) Prior Publication Data

US 2010/0214698 A1 Aug. 26, 2010

(51) Int. Cl.
G11B 5/127 (2006.01)
(52) U.S. Cl. .......................... 360/319; 428/815; 428/816
(58) Field of Classification Search .................. None
See application file for complete search history.

(56) References Cited

U.S. PATENT DOCUMENTS

| | | | |
|---|---|---|---|
| 5,032,945 A | 7/1991 | Argyle et al. | |
| 5,208,715 A * | 5/1993 | Mowry | 360/319 |
| 5,515,221 A | 5/1996 | Gill et al. | |
| 5,621,592 A * | 4/1997 | Gill et al. | 360/319 |
| 6,169,646 B1 * | 1/2001 | Macken et al. | 360/319 |
| 6,222,702 B1 | 4/2001 | Macken et al. | |
| 6,292,334 B1 | 9/2001 | Koike et al. | |
| 6,358,635 B1 | 3/2002 | Min et al. | |
| 6,437,949 B1 | 8/2002 | Macken et al. | |
| 6,597,545 B2 | 7/2003 | Macken et al. | |
| 6,710,982 B2 * | 3/2004 | Mack et al. | 360/319 |
| 6,807,031 B2 | 10/2004 | Macken et al. | |
| 2008/0043377 A1 * | 2/2008 | Yoshiike et al. | 360/319 |

FOREIGN PATENT DOCUMENTS

JP 11031306 A * 2/1999

OTHER PUBLICATIONS

JPO Abstract Translation of JP 11-031306 A (Feb. 1999).*
Machine Translation of JP 11-031306 A (Feb. 1999).*

* cited by examiner

*Primary Examiner* — Kevin Bernatz
(74) *Attorney, Agent, or Firm* — HolzerIPLaw, PC

(57) ABSTRACT

A shield for a read element of a magnetic recording head includes a first domain with boundaries remote from the read element and stabilized with a patterned bias element. The patterned bias element comprises a topographical pattern of grooves formed on the shield substrate.

20 Claims, 4 Drawing Sheets

DOMAIN CONTROL IN BOTTOM SHIELD OF MR SENSOR

BACKGROUND

A magnetic read head retrieves magnetically encoded information that is stored on a magnetic medium or disc. The magnetic read head is typically formed of several layers that include a top shield, a bottom shield, and a read element or sensor positioned between the top and bottom shield. The read element may be a magnetoresistive device, such as a magnetoresistive (MR) sensor, a giant magnetoresistive (GMR) sensor, or a tunneling magnetoresistive (TMR) sensor. The read element includes at least one layer of a ferromagnetic material, which is magnetized along an easy axis of low coercivity. The read element may be oriented such that the easy axis is transverse to the direction of disc rotation and parallel to the plane of the disc. Magnetic flux from the disc surface causes rotation of the magnetization vector of the ferromagnetic layer of the read element, which in turn, causes a change in electrical resistivity of the read element. The change in resistivity of the read element can be detected by passing a sense current through the read element and measuring a voltage across the read element. External circuitry then converts the voltage information into an appropriate format and manipulates that information as necessary.

During a read operation, the top and bottom shields ensure that the read element reads only the information stored directly beneath it on a specific track of the magnetic medium or disc by absorbing any stray magnetic fields emanating from adjacent tracks and transitions. A plurality of magnetic domains exist within the bottom shield. The magnetic domains are separated by one of a plurality of magnetic domain walls. Each domain has a magnetization that is oriented in a direction different from the magnetization of all adjacent domains. The application of an external magnetic field either during manufacture or from an adjacent track or transition of the magnetic storage medium during operation to a shield can cause the magnetization of each of the domains within that shield to rotate, thereby causing the domains to move, grow, or shrink. Thus, the domain walls are relocated due to the external magnetic field. The movement of a domain wall through a portion of the shield that is directly adjacent the read element results in Barkhausen noise, which is a local perturbation of the magnetic structure within the read element, producing an unwanted change in the resistance of the read element. Until recently, Barkhausen noise induced by domain wall movement has been negligible. However, as storage densities on magnetic media and discs have increased, the read element has necessarily become smaller, more sensitive, and more susceptible to Barkhausen noise created by domain wall movement.

SUMMARY

The present invention is a magnetic shield that reduces Barkhausen noise by ensuring domain wall stability within a shield associated with a magnetic reader. The shield includes a topographically patterned bias in the vicinity of the reader that results in a domain structure with domain walls sufficiently removed from the reader so that they do not interfere with the reader. The patterned bias can be achieved, for example, by creating a topographical pattern on the substrate beneath a seed layer in the form of closely spaced parallel grooves.

DETAILED DESCRIPTION

Figure 1:
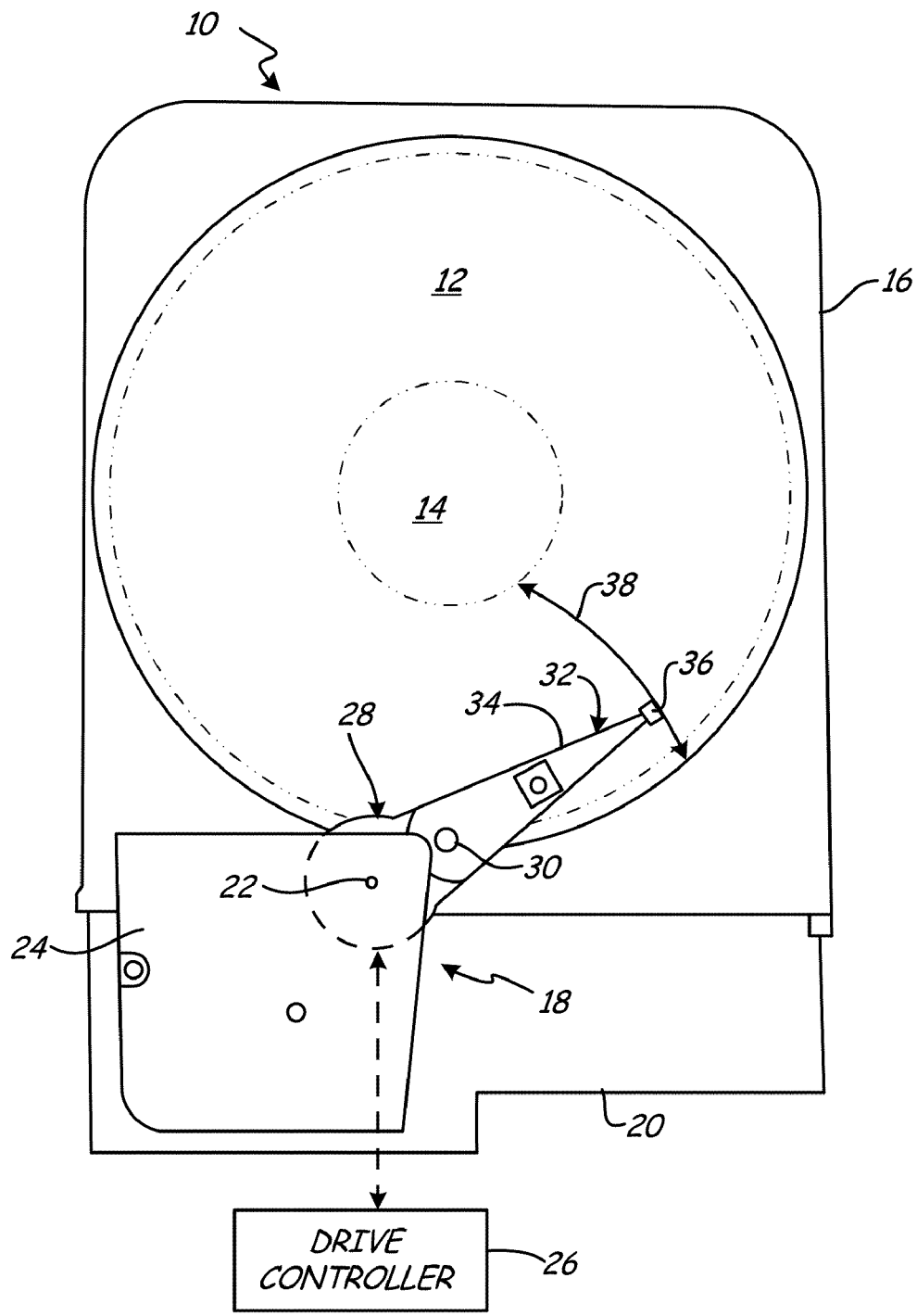
FIG. 1 is a simplified diagram of a disc drive storage system.

FIG. 1 is a top view of disc drive system 10, which includes magnetic disc 12 mounted for rotational movement about an axis defined by spindle 14 within housing 16. Disc drive 10 also includes actuator 18 mounted to base plate 20 of housing 16 and pivotally movable relative to disc 14 about axis 22. Cover 24 covers a portion of actuator 18. Drive controller 26 is coupled to actuator 18. Drive controller 26 is either mountable within disc drive system 10 or is located outside of disc drive system 10 with suitable connection to actuator 18. Actuator 18 includes actuator arm assembly 28, rigid support member 30, and head gimbal assembly 32. Head gimbal assembly 32 includes flexure arm 34 coupled to rigid member 30 and air bearing slider 36 coupled to flexure arm 34 by a gimbal. Slider 36 supports a magnetic read/write transducer or head for reading information from disc 12 and writing information to disc 12.

During operation, drive controller 26 receives position information indicating a portion of disc 12 to be accessed. Drive controller 26 receives the position information from either an operator, a host computer, or from another suitable controller. Based on the position information, drive controller 26 provides a position signal to actuator 18. The position signal causes actuator 18 to pivot about axis 22. This causes slider 36 to move radially over the surface of disc 12 in a generally arc-like path indicated by arrow 38. Drive controller 26 and actuator 18 operate in a known closed loop, negative feedback manner so that the transducer carried by slider 36 is positioned over the desired portion of disc 12. Once the transducer is appropriately positioned, drive controller 26 then executes a desired read or write operation.

Figure 2:
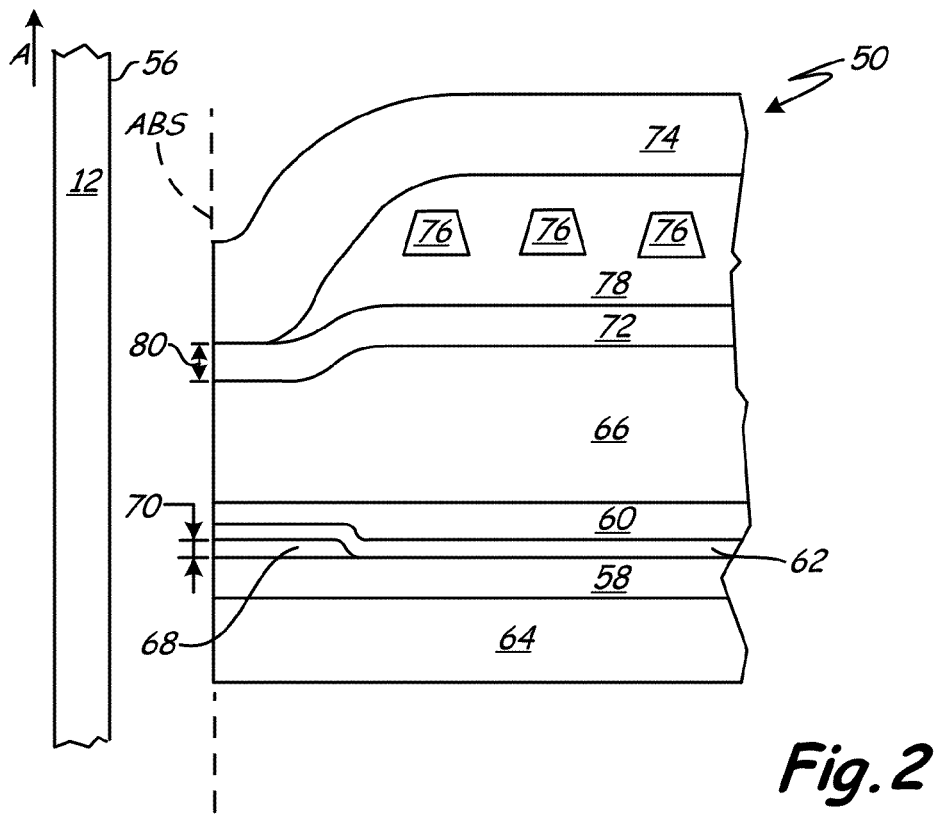
FIG. 2 is a cross-sectional view of a magnetic read/write head and a magnetic disc taken along a plane normal to an air bearing surface of the read/write head.

FIG. 2 is a cross-sectional view of magnetic read/write head 50 and magnetic disc 12 taken along a plane normal to air bearing surface 54 of read/write head 50. FIG. 2 illustrates magnetic read/write head 50 and its placement relative to magnetic disc 12. Air bearing surface ABS of magnetic read/write head 50 faces disc surface 56 of magnetic disc 12. Magnetic disc 12 travels or rotates in a direction relative to magnetic read/write head 10 as indicated by arrow A. The spacing between air bearing surface 54 and disc surface 56 is preferably minimized while avoiding contact between magnetic read head 50 and magnetic disc 12. Contact between magnetic read head 50 and magnetic disc 12 can potentially destroy both magnetic read head 50 and magnetic disc 12.

A reader portion of read/write head 50 includes bottom gap layer 58, top gap layer 60, metal contact layer 62, bottom shield 64, top shield 66, and read element 68. Read gap 70 is defined on air bearing surface 54 between bottom gap layer 58 and metal contact layer 62. Metal contact layer 62 is positioned between bottom gap layer 58 and top gap layer 60. Read element 68 is positioned between terminating ends of bottom gap layer 58 and metal contact layer 62.

A writer portion of magnetic read/write head 50 includes top shield 66, write gap layer 72, top pole 74, conductive coil 76, and insulator layer 78. Write gap 80 is defined on air bearing surface ABS by write gap layer 72 between terminating ends of top pole 74 and top shield 66. Electrically conductive coils 76 are provided to generate magnetic fields across write gap 80 and are positioned in insulator layer 78 between top pole 74 and write gap layer 72. While FIG. 2 shows a single layer of conductive coils 76, it should be understood that several layers of conductive coils, separated by insulating layers, may be used.

Figure 3:
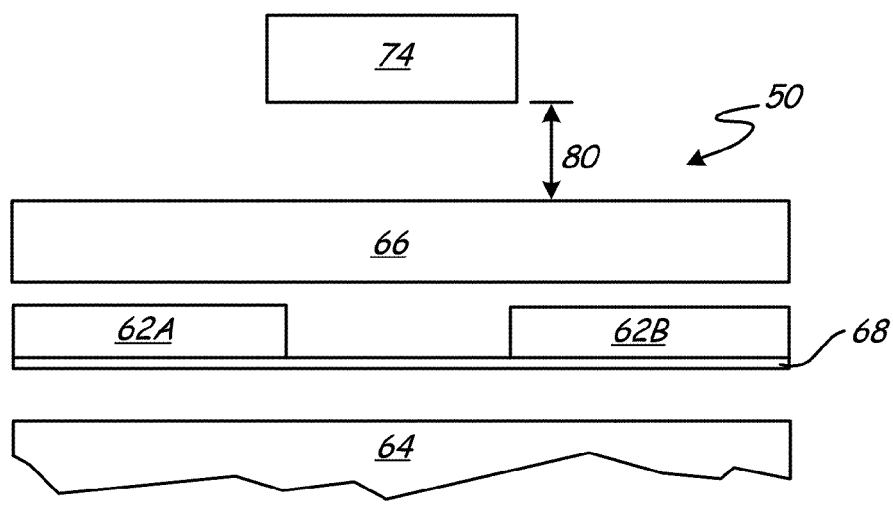
FIG. 3 is a layer diagram of a magnetic read/write head.

FIG. 3 is a layer diagram of magnetic read/write head 50. FIG. 3 illustrates the location of a plurality of magnetically significant elements of magnetic read/write head 50 as they appear along air bearing surface 54 of magnetic read/write head 50 shown in FIG. 2. In FIG. 3, all spacing and insulating layers are omitted for clarity. Bottom shield 64 and top shield 66 are spaced to provide for a location of read element 68. Read element 68 has two passive regions defined as the portions of read element 68 positioned adjacent to metal contacts 62A and 62B. An active region of read element 68 is defined as the portion of read element 68 located between the two passive regions of read element 68. The active region of read element 68 defines a read sensor width.

Read element 68 is preferably a magnetic sensor such as a magnetoresistive (MR) element, a giant magnetoresistive (GMR) sensor stack, or a tunneling magnetoresistive (TMR) sensor stack. A magnetoresistive element is generally formed of a ferromagnetic material whose resistance fluctuates in response to an external magnetic field, preferably from a magnetic medium or disc. By providing a sense current through the magnetoresistive element, a change in resistance of the magnetoresistive element can be measured and used by external circuitry to decipher the information stored on the magnetic medium or disc. A giant magnetoresistive stack operates similarly, but allows for a more pronounced magnetoresistive effect. GMR and TMR sensor stacks generally include: a ferromagnetic free layer, a ferromagnetic pinned or reference layer; and a non-magnetic spacer layer positioned between the free layer and the pinned layer. A pinned magnetization of the pinned layer is held constant while a free magnetization of the free layer is free to rotate in response to an external magnetic field, i.e. a transition from a magnetic disc. The resistivity of the stack varies as a function of an angle between the direction of the free magnetization and the pinned magnetization. In a GMR sensor stack, the spacer layer is an electrical conductor; in a TMR sensor stack, the spacer layer is an electrical insulator or barrier layer.

Read element 68 of magnetic read/write head 50 shown in FIG. 3 is configured as a current in plane (CIP) sensor with the sense current between electrodes 62A and 62B directed parallel to the ABS and transverse to the direction of motion relative to magnetic read/write head 10 as indicated by arrow A. It is to be understood that current-perpendicular-to-plane (CPP) sensor geometries can also be employed.

One problem that can be encountered with magnetic sensors (such as MR, GMR, and TMR sensors) is Barkhausen noise. Barkhausen noise results from domain wall instability in magnetic shields in the vicinity of the magnetic sensor. The domain wall instability and resulting domain wall migration produces magnetic fluctuations that are sensed by the magnetic sensor and result in noise in the sensor signal. To minimize or eliminate Barkhausen noise, it is essential to (1) minimize the number of domain boundaries in the vicinity of the sensor, and (2) to restrict or eliminate domain wall motion under the influence of an external magnetic field.

Top and bottom shields of a read element have been formed in a number of shapes including circular, square, rectangular, trapezoidal, and combinations thereof. The domain pattern in any shield is a function of a number of parameters including shape, magnetocrystalline anisotropy, internal stress and other effects. External magnetic fields such as those applied to a magnetic shield of a read element during manufacture and use tend to randomize the magnetic domain patterns of the magnetic shields. For example, when magnetic fields of sufficient magnitude are applied to the magnetic shield in its easy axis direction, the magnetic shield can saturate in the easy axis direction. When the external field is reduced to zero, square and rectangular geometries used in the prior art tend to develop unpredictable domain structures.

Figure 4:
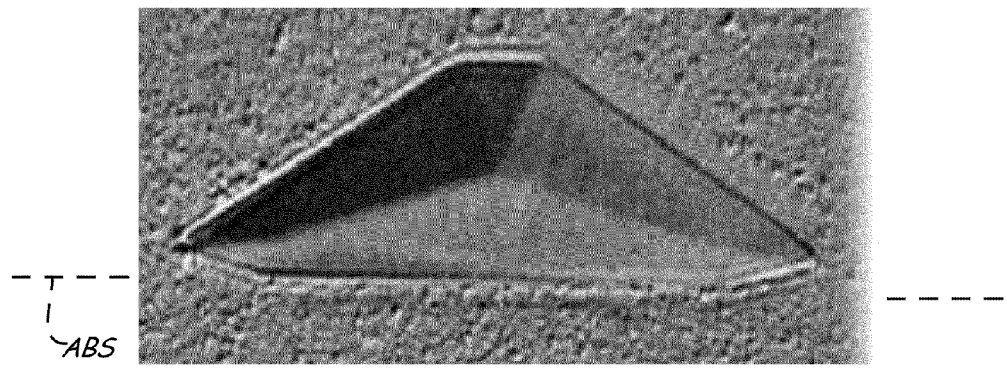
FIG. 4 is a Kerr micrograph of a lower shield showing a domain configuration.

FIG. 4 is a Kerr micrograph showing the domain pattern in a magnetic shield with a modified trapezoidal shape. This particular shield geometry has proved to be relatively stable and suitable for top and bottom shield applications for a magnetic reader. The modified trapezoidal shield geometry results in domain boundaries that are distal from the reader and a primary domain that surrounds the reader and has an easy axis of magnetization parallel to air bearing surface ABS. The domain boundary configuration in the Kerr micrograph of FIG. 4 is shown following magnetization or "setting" of the reader using bias magnets parallel to air bearing surface ABS.

Figure 5:
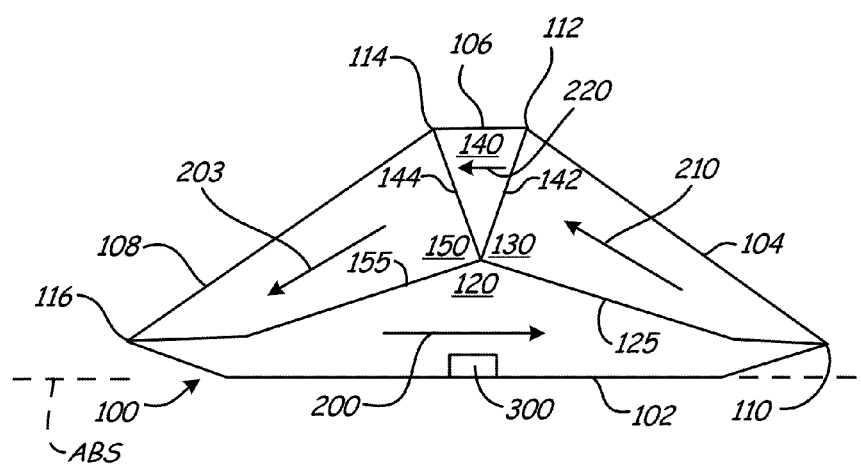
FIG. 5 is a diagram of a lower shield showing the domain configuration.

A schematic of the domain boundary configuration in FIG. 4 is shown in FIG. 5 and described herein. FIG. 5 shows reader shield 100 with trapezoidal-like boundaries 102, 104, 106 and 108 with corners 110, 112, 114 and 116. Reader 300 is surrounded by primary domain 120. Shorter domain boundaries 142 and 144 are attached to obtuse angles 112 and 114.

Primary domain 120 has magnetization vector 200 parallel to air bearing surface ABS and domain boundaries 125 and 155 are spaced away from reader 300. The shape of shield 100 encourages domains 120, 130, 140 and 150 to form following magnetization of the setting field. Following saturation magnetization, as the setting field is reduced, domain boundaries initially nucleate at the acute angles of corners 110 and 116 to minimize domain boundary energy. This results in the formation of large domains 120, 130 and 150 sharing domain boundaries 125 and 155 attached to corners 110 and 116. Shorter domain boundaries 142 and 144 are attached to obtuse angles 112 and 114. The remanent magnetization of major domain 120 is parallel to air bearing surface ABS as shown. Magnetization vectors 200, 210, 220 and 230 indicate a closed magnetic circuit. The ideal domain configuration shown in FIG. 4 does not always result following initial magnetization.

The use of a patterned bias for domain control reinforces the ideal domain configuration shown in FIGS. 4 and 5. This patterned bias results in repeateable production of shields having the domain configurations and magnetic orientations shown in FIGS. 4 and 5.

Figure 6A:
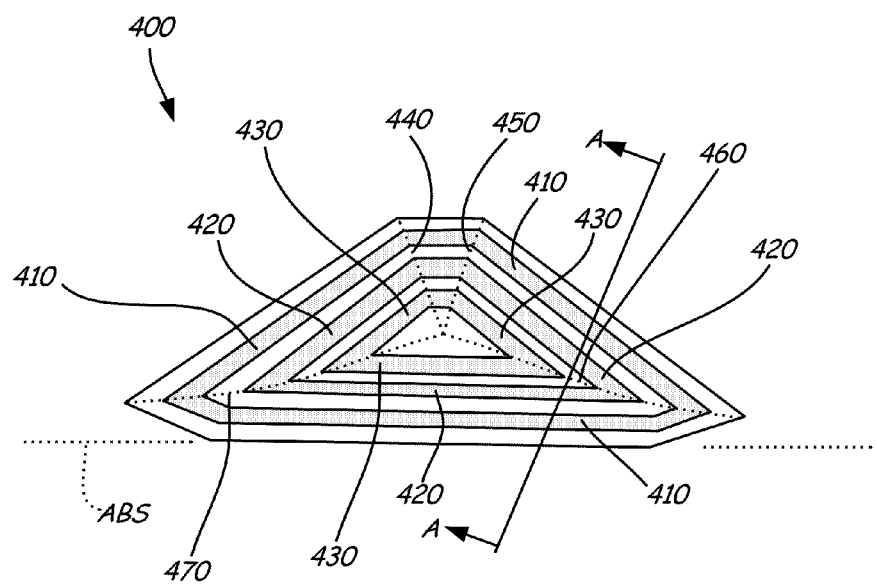
FIG. 6A is a diagram of a lower shield showing topographical features (grooves) that stabilize the domain configuration.

The domain control involves forming a pattern of parallel grooves on the substrate inside the outline of a shield to control the domain pattern and magnetization directions in the shield. FIG. 6A shows a diagram of shield 400 having a groove pattern designed to force the domain pattern shown in FIG. 5. Longitudinal grooves 410, 420, and 430 are substantially parallel to ABS and to the perimeter boundaries of the shield outline. As discussed below, the final magnetization directions will follow the grooves after magnetization. Dotted lines 440, 450, 460 and 470 are on the diagram to indicate positions of the domain boundaries following magnetization. The domain boundaries will follow a line connecting the points where the grooves and resulting magnetization directions in the final film abruptly change direction.

Figure 6B:
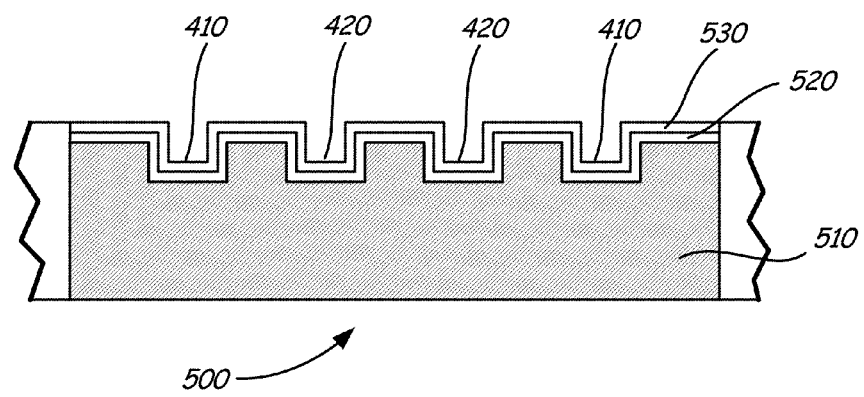
FIG. 6B is a cross-section through AA of FIG. 6A showing the grooves and magnetic layers.

Cross section 500 of shield 400 along section AA of FIG. 6A is shown in FIG. 6B. Seedlayer 520 is formed on substrate 510 and ferromagnetic layer 530 is formed on seedlayer 520. Although grooves 410 and 420 are shown with rectangular cross sections, other cross sections including but not limited to semi-circular or trapezoidal shapes can be used.

Topographical patterns of grooves such as those discussed herein can be formed on the substrate by ion beam etching, chemical etching, reactive ion etching, plasma etching, liftoff and other techniques known in the art.

The grooves on the substrate force a longitudinal geometry for the magnetization directions in the magnetic film following magnetization. The longitudinal pattern is dictated by shape anisotropy. As a result of shape anisotropy, magnetization favors high length-to-width aspect ratios. A demagnetizing field and resulting magnetostatic energy are lowest when the magnetization follows the grooves, and the ideal domain pattern shown in FIG. 5 is strongly reinforced when the substrate contains the groove patterns shown in FIG. 6A.

As described above, the disclosure includes a method to create a patterned bias on lower and shared shields that ensure the easy axes of the primary domains in the vicinity of the reader are parallel to the air bearing surface. In addition, the domain boundaries of the primary domain are sufficiently removed from the reader so that the domain boundaries do not interfere with operation of the reader.

Although the use of grooved substrate templates to create domain configurations has been described with respect to a thin film magnetic shield geometry pertaining to a modified trapezoidal shape, it should be understood that the method can be applied to any shield geometry wherein the replication of particular equilibrium domain boundary configurations is desired. Furthermore, the technique is generally applicable to any magnetic thin film structure comprising a domain structure.

The implementations described above and other implementations are within the scope of the following claims.

The invention claimed is:

1. A reader comprising:
   a magnetic sensor positioned adjacent an air bearing surface facing a magnetic medium; and
   a magnetic shield positioned adjacent to the magnetic sensor, the magnetic shield having a magnetic domain structure including a first domain adjacent to the magnetic sensor and magnetized parallel to the air bearing surface with domain boundaries located remote from the magnetic sensor and stabilized with a patterned bias element that includes a topographical pattern of grooves that change direction at boundaries of the magnetic shield.

2. The reader of claim 1, wherein the magnetic shield includes a substrate containing the topographic pattern of grooves, a seedlayer on the substrate, and a ferromagnetic layer on the seedlayer.

3. The reader of claim 1, wherein the topographical pattern of grooves includes grooves that extend parallel to the air bearing surface.

4. The reader of claim 1, wherein the topographical pattern of grooves defines a domain structure with magnetic closure and minimal domain boundaries.

5. The reader of claim 1, wherein the pattern of grooves includes a pattern of parallel grooves.

6. The reader of claim 5, wherein the pattern of parallel grooves defines a magnetization direction in each magnetic domain of the magnetic shield.

7. A magnetic reader comprising:
   a magnetic sensor with an easy axis substantially parallel to an air bearing surface; and
   a magnetic shield having a stable magnetic domain structure with a plurality of magnetic domains that are stabilized by a patterned bias element that includes a plurality of parallel grooves substantially parallel to boundaries of the magnetic shield, the magnetic domain structure including a first magnetic domain nearest the magnetic sensor with domain walls substantially remote from the magnetic sensor such that none of the magnetic domain walls of the first magnetic domain interact with the magnetic sensor.

8. The magnetic reader of claim 7, wherein an easy axis of the first magnetic domain is parallel to the ABS.

9. The magnetic reader of claim 7, wherein the pattern of grooves is formed in a shield substrate.

10. The magnetic reader of claim 7, wherein the magnetic shield includes a seedlayer on the shield substrate over the pattern of grooves, and a ferromagnetic layer on the seedlayer.

11. The magnetic reader of claim 9, wherein the pattern of grooves includes grooves parallel to the air bearing surface.

12. The magnetic reader of claim 9, wherein the pattern of grooves define the magnetic domain structure of the magnetic shield with minimal domain boundaries and magnetic closure.

13. The magnetic reader of claim 9, wherein the pattern of grooves form a pattern of parallel grooves.

14. A magnetic reader comprising:
   a magnetic sensor; and
   a magnetic shield having a magnetic domain structure including a first magnetic domain nearest the magnetic sensor having domain boundaries located substantially remote from the magnetic sensor and stabilized with a pattern of grooves that change direction at boundaries of the magnetic shield.

15. The magnetic reader of claim 14 wherein the magnetic shield is adjacent the magnetic sensor.

16. The magnetic reader of claim 15 wherein an easy axis of the first domain is configured to be parallel to an easy axis of the magnetic sensor.

17. The magnetic reader of claim 14 wherein the pattern of grooves includes at least one groove that extends parallel to an air bearing surface.

18. The magnetic reader of claim 14 wherein the grooves are substantially parallel to the boundaries of the magnetic shield.

19. The magnetic reader of claim 14 wherein the magnetic shield is the top shield of the magnetic reader.

20. The magnetic reader of claim 14 wherein the magnetic shield is the bottom shield of the magnetic reader.

* * * * *